United States Patent Office 3,330,069

Patented July 11, 1967

3,330,069
DEFROSTATION METHOD

Yoshiaki Mihara, Tokyo, Japan, assignor to National Institute of Agricultural Sciences, Ministry of Agriculture and Forestry, Tokyo, Japan No Drawing. Filed Dec. 9, 1965, Ser. No. 520,299
Claims priority, application Japan, Dec. 11, 1964, 39/69,417
5 Claims. (Cl. 47—2)

The present invention has as its object to provide protection against frost damage, to agricultural plants and fruit-trees raised in the crop fields, orchards, etc. through the prevention of the formation of frost by upholding in the air for a prolonged period of time above the crop fields, orchards, etc. low-vaporability fog which is obtainable by atomizing in the air above the crop fields, orchards, etc. water that contains an evaporation-suppressing agent.

More specifically this invention relates to a method whereby the formation of frost is prevented by atomizing in the air above the crop fields, orchards, etc. water containing the evaporation-suppressing agent which comprises higher alcohol or a higher alcohol bonded with an appropriate hydrophilic radical.

It is a known fact that in general when the sky is covered with fog or cloud the long wave or infrared radiation from the ground surface is minimized, even when such fog or cloud is as small in thickness as a fraction of that observed in a cloudless night. However, it is impossible to reproduce such a meteorological phenomenon for the reason that in a cloudless night, the humidity of the air is low and therefore droplets of water are quickly evaporated thereby preventing the formation of the desired fog layer. Recently another method, different from that of the artificial fog layer method, was proposed with a view to eliminating frost damage to plants in the crop fields, orchards, etc., whereby the radiation from the ground surface as well as the decrease in the atmospheric temperature are prevented by means of the so-called "smoke screen" which is obtainable by the incomplete combustion of heavy oil or zinc chloride, etc. This method, however, resulted in failure because hardly any effect was observed of the prevention of the cooling of the ground surface and of the resultant damages to plants and fruits thereby even though the method was effective in producing the smoke screen.

The present inventor studied defects of the foregoing method and discovered that the cause of its being useless in the prevention of frost is that the smoke from heavy oil combustion and chemical particles such as of zinc chloride have little power to absorb infrared rays emitted from the ground surface and accordingly its effect in the prevention of radiation cooling is extremely low.

The present inventor, thus, effected research so as to formulate a composition of a solution which can be atomized and stay in the air above the ground surface for a prolonged period of time as a fog of microdroplets without becoming gasified even under the conditions of a cloudless night in winter with a low atmospheric humidity.

As a result of said research, it has been discovered that by means of atomizing into droplets a solution containing one type or more than two types of a substance expressed by the general formula:

$$CH_3—(CH_2)m—O—(CH_2—CH_2—O)nH$$

where $m$ denotes 15–25 and $n$ represents 0 or 1–4, the surface of the droplets will be covered instantaneously by a monomolecular film formed by the aforesaid substance and the vaporization of the droplets can be remarkably suppressed. The object of this invention, which is based on this discovery, is to provide a method for the prevention of frost damage by forming an artificial fog layer over the crop fields, orchards, etc.

Substances expressed by the said general formula which may be contained in the droplets for forming the fog of the present invention are: hexadecanol, octadecanol, isosanol, docosanol, monoxyethylene dococylether, dioxyethylene dococylether, trioxyethylene dococylether, monoxyethylene hexadecylether, monoxyethylene octadecylether etc.

In the application of these substances in the method of the present invention, a solution for suppressing evaporation of the atomized fog is prepared by adding to water one or more types of the substance expressed by the said general formula in the quantity by volume of 0.03–0.2% or optimally 0.1% or so.

It is desirable that the above-mentioneed evaporation-suppressant be finely emulsified through heavy agitation or by using an appropriate emulsifier.

The evaporation-suppressing emulsion prepared in this manner is, then, atomized by the use of a device for the generation of microdroplets of the emulsion. For floating propery in the air, the microparticles thus atomized are required to be less than 40 microns in diameter. Further, in order to conform to the present invention, the diameter of those microdroplets atomized and floating in the air should be, for improved performance of absorbing infrared ray and of warmth-keeping function, equal to or over the length of the infrared ray at night, namely it should be larger than 5 microns. Considered from these two aspects, an optimum diameter of the droplets should range from 40 microns to 5 microns.

The time taken in the gasification of the fog generated from the evaporation-suppressing emulsion varies depending upon the composition of the evaporation-suppressant, applied temperature and relative humidity. For instance, when in the atmosphere with a temperature of 7.0° C. and a relative humidity of 80% an emulsion prepared by adding to water 0.2% of a mixture of monoxyethylene dococylether and monoxyethylene octadecylether is atomized into droplets with 5–40 microns in diameter, the gasification speed of these floating droplets can be reduced to $\frac{1}{600}$–$\frac{1}{800}$ of that required by droplets of pure water and the time taken by such droplets of the prepared solution to get totally gasified is 3–13 hours. The time required for the disappearance of the droplets is generally extended in accordance with the decrease in the temperature.

In order to prevent the drop in the temperature of the ground surface at night, it is necessary that the fog cover an extended area and that the fog be large in its volume. It is known according to the meteorological knowledge that a 0.02 mm.-thick water layer allows the penetration of $\frac{1}{100}$ only of an infrared ray having a wave length of 6 microns and one-tenth of the ray is allowed to pass through even in the case the layer be 0.01 mm. in thickness. In consequence, by atomizing and floating in the air the said evaporation-suppressing solution at a rate of 2–3 liters per area, i.e. 0.02–0.03 mm. in terms of thickness of the water layer of the solution, the greater part of the infrared radiation from the ground surface is absorbed into the fog layer. Thus the infrared ray absorbed by the fog layer is emitted onto the ground surface greatly lowering in consequence the radiation of heat from the ground surface. The quantity of radiation returned from the fog layer is proportional to its temperature and therefore an optimal height of the floating fog layer is between 5 and 100 meters above the ground surface. In working out the method of the present invention, the evaporation-suppressing solution prepared in the manner described above is spread over an extended area by atomizing from the ground or the air in a continuous manner into fog droplets which are caused to reach a height of scores of meters and spread above the ground through the utilization of slow-moving atmospheric currents observed at night or by moving the atomizing device in case of a dead calm.

In the following are examples of the present invention:

*Example 1.*—An evaporation-suppressing solution is prepared by adding to 200 liters of water a mixture of monoxyethylene dococylether and monoxyethylene octadecylether in the quantity of 0.4 liter which is dispersion-suspended in the said water. By the use of an atomizing device this suspension is pressurized and heated and is atomized through a nozzle of the said device into fog droplets having a diameter of less than 40 microns. Floating fog droplets are generated at a rate of 2 liters per minute in terms of the solution. Starting at midnight the atomizing was effected for a duration of 90 minutes thereby covering with said fog droplets a round valley with an area of 60 acres surrounded by hills. The strength of the net outgoing radiation from the ground surface covered with the fog was reduced to 40% of that from an uncovered area adjacent to the test site. In this area without the fog, the temperature lowered to 1° C. from 7° C. with a drop of 6° C., whereas the temperature decrease in the area where the method of the invention was applied was 4° C. only falling from 7° C. to 3° C. and thus freezing of the ground surface was prevented. Cold air which drifted in out of the round valley accounts for the fact that degrees of the temperature drop and the radiation decrease were not in proportion.

*Example 2.*—To 200 liters of water a 0.4-liter mixture comprising hexadecanol 60% and octadecanol 40% and a 0.03 kg. of an emulsifying agent were added and the solution thus prepared was atomized by an atomizing device over the round valley referred to in Example 1 above. After atomizing for 90 minutes, the fog totally covered the valley and the fog layer remained in position for 4 hours. In this duration of 4 hours, in the adjacent area without fog layer the temperature dropped from 6° C. to 2° C. but in the area within the valley where the method was applied the temperature dropped merely from 5.8° C. to 3.5° C. establishing definitely the warmth retention characteristic of the invented method.

*Example 3.*—An emulsion was prepared in a manner identical with that of Example 1 by adding to 1 liter of water a 2-gram mixture comprising icosanol and monoxyethylene dococylether. The emulsion thus prepared was atomized by an atomizing device into the droplets having diameters of 30 microns and 20 microns respectively and they were separately placed on cobwebs having a diameter of 0.5 micron which were then left in the air with a temperature of 5° C. and a relative humidity of 80%. Time consumed in getting those droplets reduced to 3 microns in diameter was 16 hours on an average with the 30-micron droplets and 9 hours on the average with the 20-micron fog particles. This outcome indicated that the said emulsion is applicable for outdoor uses also as was the case with the evaporation-suppressing solution referred to in Example 1.

*Example 4.*—An emulsion was prepared by adding to 1 liter of water 2 grams of monoxyethylene hexacocylether $C_{26}H_{53}O \cdot C_2H_4OH$ and 0.2 gram of sodium dioctyl sulfosuccinate as an emulsifying agent. This emulsion was atomized onto cobwebs as in Example 3 and the life of the fog droplets on the cobwebs placed in the air having a temperature of 15° C. and a relative humidity of 80% was measured. The time consumed in reduction to 3 microns in diameter was 12 hours on an average with the 30-micron droplets and 7 hours on an average with the 20-micron droplets. Further, the life of the droplets in the air with a temperature of 3° C. and a relative humidity of 80% was less than a half of that required in the air with a temperature of 15° C. The evaporation-suppressing solution herein employed was superior to those referred to in Examples 1 and 2.

What is claimed is:

1. A method for the prevention of frost on ground groups by minimizing heat radiation loss, said method comprising forming an artificial fog layer in the air above the crop by atomizing a mixture of water and one substance selected from the group expressed by the following formula:

$$CH_3—(CH_2)m—O—(CH_2—CH_2—O)nH$$

wherein $m$ is between 15 and 25 and $n$ is between 0 and 4, the latter substance forming a protective coating on atomized water particles to inhibit evaporation thereof, and wherein said substance is present in an amount between 0.03 and 0.2% by volume.

2. A method as claimed in claim 1 wherein the atomized fog particles are formed with a diameter between 5 and 40 microns.

3. A method as claimed in claim 1 wherein said water and the substance are emulsified before being formed as said fog.

4. A method as claimed in claim 1 wherein said substance is a mixture of monoxyethylene dococylether and monoxyethylene octadecyl ether.

5. A method as claimed in claim 1 wherein said substance is a mixture of hexadecanol and octadecanol.

References Cited

UNITED STATES PATENTS

| | | | |
|---|---|---|---|
| 3,055,144 | 9/1962 | Johnson et al. | 47—2 |
| 3,205,059 | 9/1965 | Roberts | 71—2.7 |

FOREIGN PATENTS

| | | |
|---|---|---|
| 518,190 | 11/1955 | Canada. |
| 1,264,727 | 5/1961 | France. |

ABRAHAM G. STONE, *Primary Examiner.*

ROBERT E. BAGWILL, *Examiner.*